June 26, 1951 P. DANIELSSON 2,558,608
FISH EVISCERATING MACHINE
Filed July 15, 1947

Inventor
Paul Danielsson
by Sommers & Young
Attorneys

Patented June 26, 1951

2,558,608

UNITED STATES PATENT OFFICE 2,558,608

FISH EVISCERATING MACHINE

Paul Danielsson, Stora Essingen, Sweden, assignor to Arenco Aktiebolag, Stockholm, Sweden, a Swedish joint-stock company Application July 15, 1947, Serial No. 760,949
In Sweden October 27, 1941

Section 1, Public Law 690, August 8, 1946
Patent expires October 27, 1961

4 Claims. (Cl. 17—3)

This invention relates to the eviscerating of fish, and more particularly to machines for this purpose of the kind having a rotary eviscerating roller coacting with a support, e. g. with another eviscerating roller, to pull the entrails out of the opened head end of the fish. This is a convenient arrangement, inasmuch as the fish may be advanced continuously when being eviscerated, and no means are operative within the body of the fish, so that the viscera, e. g. its stomach, cannot be cracked or worn to rags within the body of the fish.

It is an object of the invention to make provision for further improvement of this arrangement so that thick or filled parts of the entrails, e. g. the stomach, will be leniently treated by the eviscerating roller or rollers, even though the latter will effectively grasp such viscera to pull them out of the body of the fish.

A further object of the invention is to develop the eviscerating roller or rollers to first leniently pull the filled stomach and other thick and delicate parts of the viscera out of the body of the fish and thereafter forcibly seize the thin and slippery intestine and detach same from the body of the fish on pulling it out of the latter.

These and other objects will be in part obvious and will in part be hereinafter more fully disclosed.

Figures 3, 4:
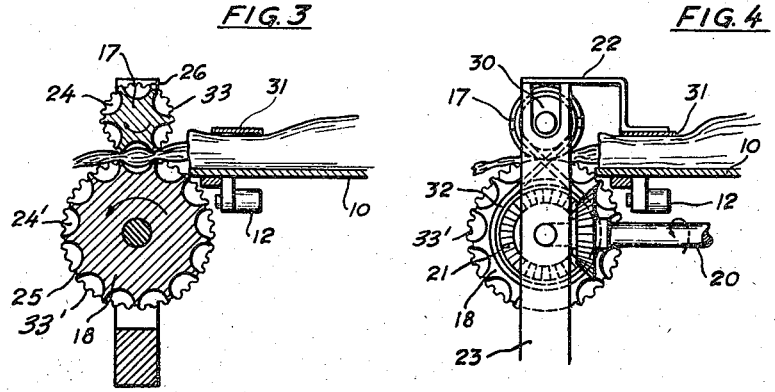
Fig. 3 is a sectional view, on an enlarged scale, taken on the line III—III of Fig. 2.
Fig. 4 is a sectional view, on an enlarged scale, taken on the line IV—IV of Fig. 2.

Referring to the drawing, the fish conveyor 1 consists of an endless chain 12 provided with transverse pockets 9. The conveyor chain 12 runs over a driving sprocket 2 and an idle sprocket 3. The sprocket 2 is keyed to a shaft 5 which is rotatably journalled in the machine frame 4 and, by means of a bevel gear 6, is connected to a shaft 7. The shaft 7 is driven by means of a pulley 8 and belt (not shown). The pockets 9 of the fish conveyor are formed by partitions 11 and bottom plates 10 which form angle-bars pivotally and transversely connected to the chain 12. The plates 10 may, however, be omitted, in which case the partitions 11 act as impellers for advancing the fish laterally upon a conveyor track. At one side of the conveyor 1 are provided a gauge plate 13 for adjusting the longitudinal positions of the fish in the pockets 9 and a circular head cutter 14 which is secured to a rotary shaft 15 and adapted to decapitate the fish in transit. The shaft 15 is driven from the shaft 7 by means of a bevel gear 16. Sequent to the cutter 14 and at the same side of the conveyor 1 two coacting rollers 17 and 18 extend longitudinally of the conveyor and are operative to pull the entrails out of the head end of the fish. The lower roller 18 is rotated by the shaft 7 by means of a bevel gear 19, a shaft 20 and another bevel gear 21. The upper roller 17 is driven by the roller 18 by means of a crossed tensioned belt 32 of rubber, so that the rollers 17 and 18 revolve in opposite directions (Fig. 3) and at the same peripheral velocities. The roller 17 is journalled in vertical slots 30 in standards 23 and 26 of the machine frame, so that it can adjust itself vertically. Above the conveyor 1 along the eviscerating rollers 17 and 18 extends a bar 31 which is secured to the standard 23 by means of a blade spring 22. Thereby the bar 31 can yield upwards so that it engages with substantially invariably yielding pressure the fish that are advanced laterally by the conveyor 1 below said bar 31. By the pressure exerted by the bar 31, part of the viscera is squeezed out of the head end of the fish decapitated by the cutter 14, and said part of the viscera is introduced into the gap between the revolving rollers 17 and 18 and seized by them to pull the viscera out of the body of the fish.

Figure 1:
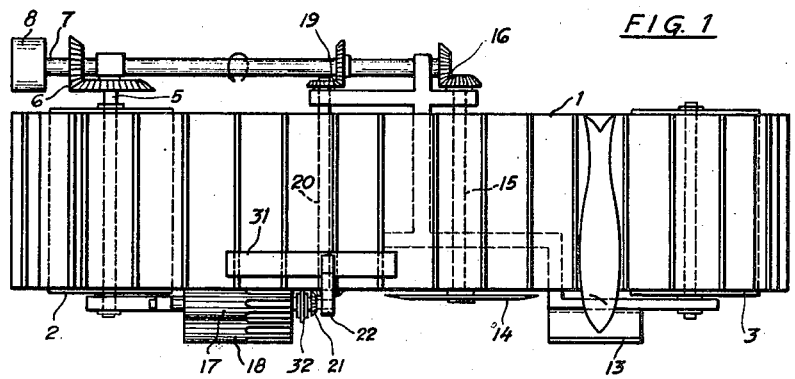
Fig. 1 is a plan of a fish-eviscerating machine provided with a device embodying the invention.
Figure 2:
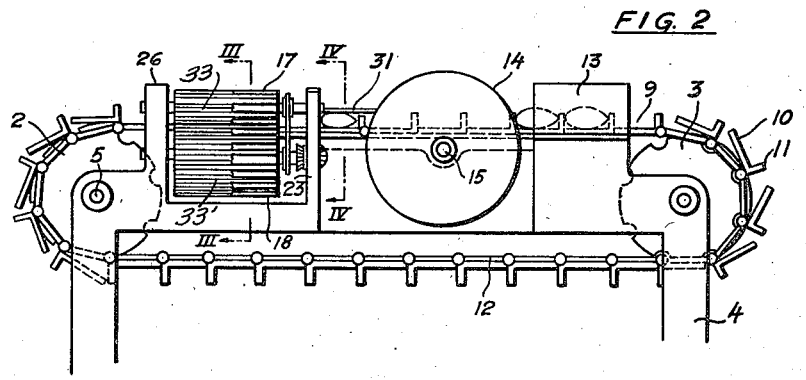
Fig. 2 is a side elevation of the machine.

The rollers 17 and 18 have at their ends directed oppositely to the fish-feeding direction relatively deep and wide notches or grooves 24 and 24' respectively, that extend longitudinally over part of each roller. Said grooves are adapted to receive the relatively thick parts of viscera at the head end of the fish, such as the filled stomach that are first pulled out of the body of the fish. The rollers 17 and 18 are driven so that their grooves face one another by pairs at the gap between the rollers (Fig. 3), whereby deep and relatively wide longitudinal chambers are formed in which the contents of the viscera squeezed between the ridges 25 of the rollers 17 and 18 can expand the viscera so that the latter will not be crushed. After the thick or filled part of the viscera has been pulled out of the body of the fish when advancing laterally, there remains the intestine which is slippery and relatively thin and attached to the body of the fish. The ends of the eviscerating rollers 17 and 18 directed in the fish-feeding direction and adapted to pull out said part of the viscera, are developed accordingly. Thus the left hand parts (Figs. 1 and 2) of the rollers 17 and 18 are fluted, that is, the deep and wide grooves 24 merge into longitudinal flutes or corrugations 33 and 33' respectively, which are shallower than the grooves 24 so that the rollers can forcibly seize the intestine to tear it off the body of the fish and remove it therefrom. In order to facilitate this removal of the intestine, the fluted ends of the rollers extend conveniently beyond the pressing bar 31, so that they will still act upon the intestine after the advancing fish has left said bar.

I claim:

1. In a fish eviscerating machine, a rotary eviscerating member, a rotary eviscerating roller disposed adjacent and oppositely to said member, means disposed adjacent said roller for feeding the fish laterally in a direction longitudinally of said roller, and means connected with said roller for rotating said roller to coact with said member and pull the entrails out of the open head end of the laterally advancing fish, said roller having deep and wide grooves forming cavities adapted to receive thick or expanding portions of the entrails passing between said roller and said member, said grooves extending longitudinally of said roller from the one of its ends that is directed in a direction opposite to the fish feeding direction and terminating at a distance from the other end of said roller, said roller having also narrow corrugations extending longitudinally between said grooves and said other end of said roller.

2. In a fish eviscerating machine, a pair of opposed eviscerating rollers, means disposed adjacent said rollers for feeding the fish laterally in a direction longitudinally of said rollers, and means connected with said rollers for rotating said rollers in opposite directons to coact and pull the entrails out of the open head end of the laterally advancing fish, said rollers having deep and wide grooves forming cavities adapted to receive thick or expanding portions of the entrails passing between said rollers, said grooves extending longitudinally of said rollers from the one of the ends of the rollers that is directed in a direction opposite to the fish feeding direction and terminating at a distance from the other end of said rollers, said rollers having also narrow corrugations extending longitudinally between said grooves and said other end of said rollers.

3. In a fish eviscerating machine, a rotary eviscerating member, a rotary eviscerating roller disposed adjacent and oppositely to said member, means disposed adjacent said roller for feeding the fish laterally in a direction longitudinally of said roller, and means connected with said roller for rotating said roller to coact with said member and pull the entrails out of the open head end of the laterally advancing fish, said roller having deep and wide grooves forming cavities adapted to receive thick or expanding portions of the entrails passing between said roller and said member, said grooves extending longitudinally of said roller from the one of its ends that is directed in a direction opposite to the fish feeding direction and terminating at a distance from the other end of said roller, said roller having also in its cylindrical surface a rough portion extending longitudinally between said grooves and said other end of said roller.

4. In a fish eviscerating machine, a pair of opposed eviscerating rollers, means disposed adjacent to said rollers for feeding the fish laterally in a direction longitudinally of said rollers, and means connected with said rollers for rotating said rollers in opposite directions to coact and pull the entrails out of the open head end of the laterally advancing fish, said rollers having deep and wide grooves forming cavities adapted to receive thick or expanding portions of the entrails passing between said rollers, said grooves extending longitudinally of said rollers from the one of the ends of the rollers that is directed in a direction opposite to the fish feeding direction and terminating at a distance from the other end of said rollers, said rollers having also in their cylindrical surfaces a rough portion extending longitudinally between said grooves and said other end of said rollers.

PAUL DANIELSSON.

REFERENCES CITED

The following references are of record in the file of this patent:

UNITED STATES PATENTS

| Number | Name | Date |
|---|---|---|
| 1,164,110 | Nagele | Dec. 14, 1915 |
| 1,402,421 | Heath | Jan. 3, 1922 |
| 2,169,791 | Danielsson | Aug. 15, 1939 |
| 2,169,905 | Sevek | Aug. 15, 1939 |